(12) United States Patent
Lakhzouri et al.

(10) Patent No.: US 8,849,605 B2
(45) Date of Patent: Sep. 30, 2014

(54) METHOD AND APPARATUS FOR SENSOR BASED PEDESTRIAN MOTION DETECTION IN HAND-HELD DEVICES

(75) Inventors: Abdelmonaem Lakhzouri, Tampere (FI); Joonas V. T. Viskari, Lempaala (FI)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 13/215,580

(22) Filed: Aug. 23, 2011

(65) Prior Publication Data

US 2013/0054181 A1  Feb. 28, 2013

(51) Int. Cl.
*G06F 15/00* (2006.01)

(52) U.S. Cl.
USPC ............................. 702/141; 73/1.37

(58) Field of Classification Search
CPC ........... G06F 15/00; G01S 3/02; G01S 11/02; G01C 22/00; G01P 2015/08; G01P 2015/0805; G01P 2015/0862; G01P 7/00; G01P 11/00; G01P 13/00; G01P 15/00; G01P 15/18; G06K 9/00; A61B 5/103
USPC ...................................... 702/85, 141; 73/1.37
See application file for complete search history.

(56) References Cited

U.S. PATENT DOCUMENTS

| | | | | |
|---|---|---|---|---|
| 6,571,193 | B1 * | 5/2003 | Unuma et al. | 702/141 |
| 8,075,499 | B2 * | 12/2011 | Nathan et al. | 600/587 |
| 2008/0275348 | A1 * | 11/2008 | Catt et al. | 600/483 |
| 2009/0161915 | A1 * | 6/2009 | Chen et al. | 382/107 |
| 2009/0189813 | A1 * | 7/2009 | Haas et al. | 342/384 |
| 2009/0265671 | A1 * | 10/2009 | Sachs et al. | 715/863 |
| 2009/0312973 | A1 * | 12/2009 | Hatlestad et al. | 702/85 |
| 2011/0313716 | A1 * | 12/2011 | Smid et al. | 702/141 |
| 2013/0018283 | A1 * | 1/2013 | Halkias et al. | 600/595 |
| 2013/0158941 | A1 * | 6/2013 | Yang et al. | 702/141 |

FOREIGN PATENT DOCUMENTS

EP  2250964 A1  11/2010

OTHER PUBLICATIONS

Hanson M., et al., "Teager energy assessment of tremor severity in clinical application of wearable inertial sensors", Life Science Systems and Applications Workshop, 2007. LISSA 2007. IEEE/ NIH, IEEE, PI, Nov. 1, 2007, pp. 136-139, XP031189200, ISBN: 978-1-4244-1812-1 the whole document.
International Search Report and Written Opinion—PCT/US2012/052166—ISA/EPO—Nov. 27, 2012.

(Continued)

*Primary Examiner* — John Breene
*Assistant Examiner* — Ruihua Zhang
(74) *Attorney, Agent, or Firm* — Mahamedi Paradice LLP

(57) ABSTRACT

A method and apparatus are described for sensor based detection of pedestrian motion. Based on a 3-axis accelerometer, the apparatus may differentiate between walking, running, standing still, or any random movement that the user may perform. The method may comprise the steps of performing a time domain analysis and a frequency domain analysis. The time domain analysis may be based on a Teager-Kaiser Energy Operator. The frequency domain analysis may be based on a fast Fourier transform. A apparatus for detecting pedestrian motion may comprises an accelerometer, an operator, a Teager-Kaiser Energy Operator, a first peak detection, a second peak detection, a buffer, a fast Fourier transform, a memory and a look-up table. The apparatus may be a hand held device.

19 Claims, 6 Drawing Sheets

(56) References Cited

OTHER PUBLICATIONS

Li X., et al., "The effect of short-term changes in body mass distribution on feed-forward postural control", Journal of Electromyography and Kinesiology, Elsevier, Amsterdam, NL, vol. 19, No. 5, Oct. 1, 2009, pp. 931-941, XP026501800, ISSN: 1050-6411, DOI: 10.1016/J.JELEKIN.2008.05.003 [retrieved on Jul. 9, 2008] the whole document.

* cited by examiner

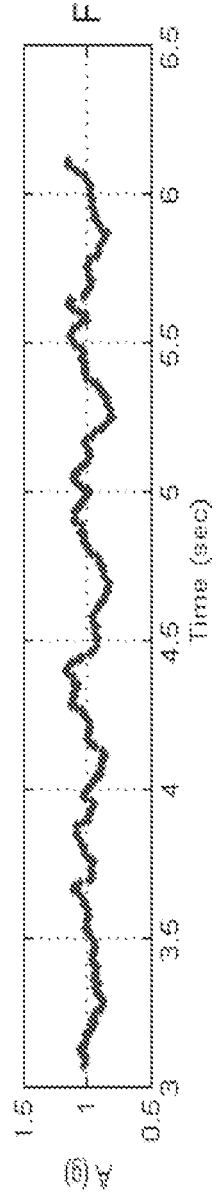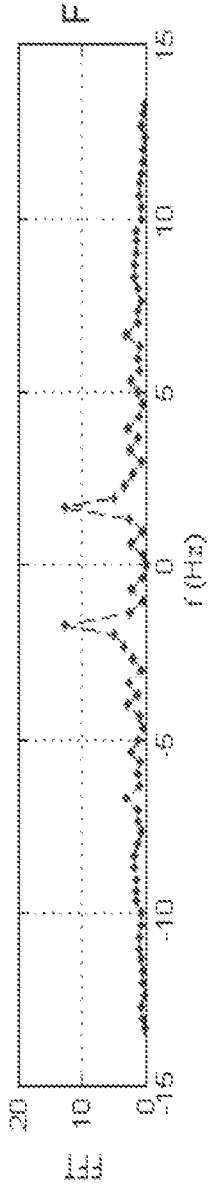

METHOD AND APPARATUS FOR SENSOR BASED PEDESTRIAN MOTION DETECTION IN HAND-HELD DEVICES

TECHNICAL FIELD

The present specification describes an apparatus and method that generally relates to detecting movement styles and specifically to detection of movement by pedestrian with a hand-held device.

BACKGROUND

Traditionally, pedestrian movements are detected through step recognition. The aim of these methods is basically to determine the walking step length. Different researchers have used different methods to determine step-length, for instance modeling the step-length as a linear combination of step-frequency and accelerometer variance. Additionally, other methods have been based on determining the step-size based on the walking speed, using a second-order polynomial function, or using GPS positioning information for real-time step estimation using a Kalman filter.

The aforementioned methods fail to detect or differentiate movement styles performed by pedestrians such as walking, running, standing still, or any random movement that the user may perform. In applications, such as social gaming, or pure pedestrian navigation, knowing different movement phases of pedestrians may be valuable information.

Hence, it would be beneficial to detect walking steps as well as any movement that the user may perform in the context of social gaming.

SUMMARY

A method and an apparatus are described for sensor based detection of pedestrian motion. Based on a 3-axis accelerometer, the apparatus may differentiate between walking, running, standing still, or any random movement that the user may perform. The method may comprise the steps of performing a time domain and frequency domain analysis, and utilizing one or more processors to perform the time domain analysis and the frequency domain analysis. The time domain analysis may be based on a Teager-Kaiser Energy Operator. The frequency domain analysis may be based on a fast Fourier transform.

In all, the method may comprise the steps of determining the magnitude of the output of an accelerometer; processing the magnitude of the output of an accelerometer in the Teager-Kaiser Energy Operator and the fast Fourier transform. Then determining status of the processed information in a first peak detection and a second peak detection; and subsequently determining the hand motion and step motion from a look-up table. The step motion comprises running and walking. The hand motion comprises shaking, waving and gesturing.

An apparatus for detecting pedestrian motion, according to one embodiment of the present specification may comprises an accelerometer, an operator, a Teager-Kaiser Energy Operator, a first peak detection, a second peak detection, a buffer, a fast Fourier transform, a memory and a look-up table. The apparatus may be a hand held device.

BRIEF DESCRIPTION OF THE DRAWINGS

FIGS. 1A and 1B are coupled together at points A and B.

FIGS. 4A, 4B and 4C illustrates the frequency domain processing in accordance with an embodiment of the present specification. FIG. 4A illustrates the time domain output of the accelerometer. FIG. 4B illustrates the output of the fast Fourier transform of the time domain signal of FIG. 4A. FIG. 4C illustrates the output of the fast Fourier transform of the time domain signal of FIG. 4A after filtering out zero frequency component.

The components in the figures are not necessarily to scale, emphasis instead being placed upon illustrating the principles of the present invention. In the figures, like reference numerals designate corresponding parts throughout the different views.

DETAILED DESCRIPTION

The present specification provides an improved apparatus and method of detecting movement styles performed by pedestrians holding a device on their hands or attached to their bodies. Based on a 3-axis accelerometer, the device may differentiate between walking, running, standing still, or any random movement that the user may perform. In applications, such as social gaming, or pure pedestrian navigation, knowing different movement phases of pedestrians may be valuable information. The method utilizes time and frequency domain analysis.

DEFINITIONS

Static status—The status of a peak detector when the number of peaks detected is minimal relative to sensing motion of the pedestrian. In this situation, the peak detection block generates a "NO" status and a "no motion" state is output. No further analysis occurs.

Positive peak status—The status of a peak detector when the number of peaks detected is not minimal relative to sensing motion of the pedestrian. In this case, the peak detection block generates a "Yes" status and the motion detector continues to analyze the motion of the pedestrian.

M—M is an integer and is meant to convey an M point buffer and the related M point fast Fourier transform. M may be a design choice.

The Apparatus

Figure 1A:
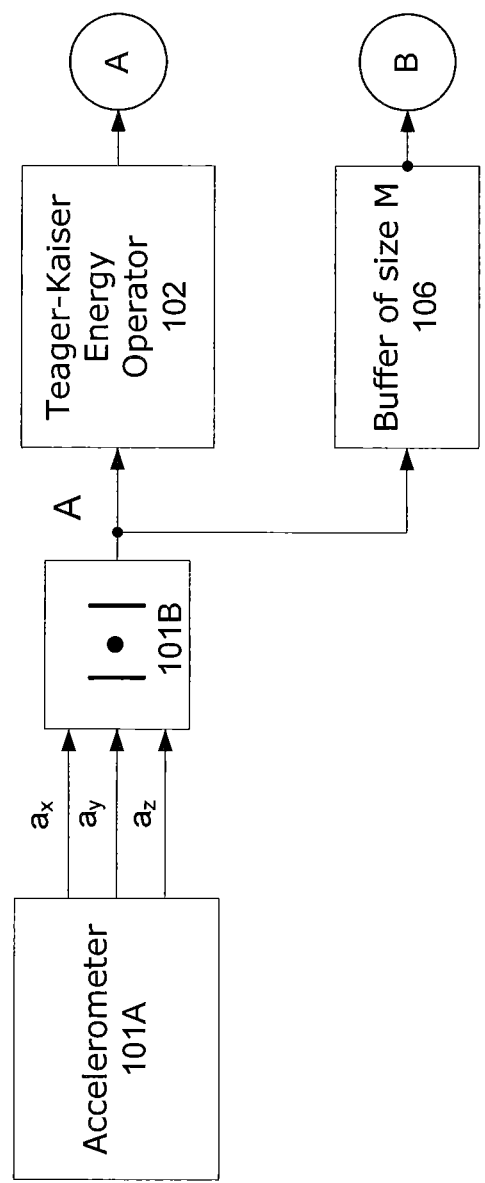
FIG. 1A and FIG. 1B illustrates a block diagram of a motion detection apparatus in accordance with an embodiment of the present specification. Part of the motion detector apparatus is in FIG. 1A and part is in FIG. 1B.
Figure 1B:
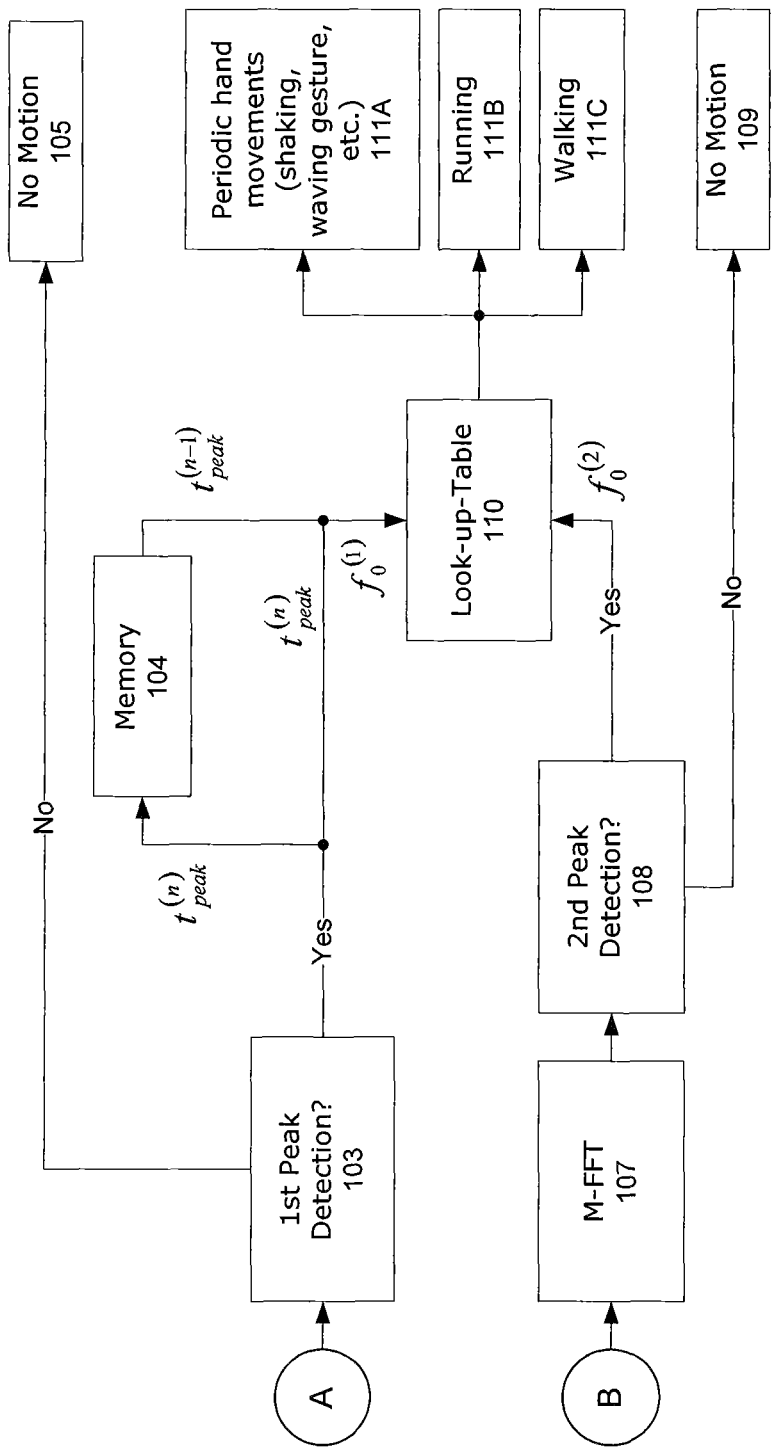

Block diagram 100, as shown in FIG. 1, illustrates an apparatus for detection of pedestrian motion, according to one embodiment of the present specification. The apparatus comprises an accelerometer 101A, an operator 101B, a Teager-Kaiser Energy Operator 102, a first peak detection 103, a second peak detection 108, a buffer 106, a fast Fourier transform, M-FFT 107, a memory 104 and a look-up table 110.

The component outputs of the accelerometer 101A are denoted by $a_x$, $a_y$ and $a_z$ expressed in unit of g (g=9.8 m/s). The component outputs of the accelerometer 101A are coupled to operator 101B which generates the accelerometer magnitude A. The accelerometer magnitude A is determined as:

$$A = \sqrt{a_x^2 + a_y^2 + a_z^2}$$

Figure 2:
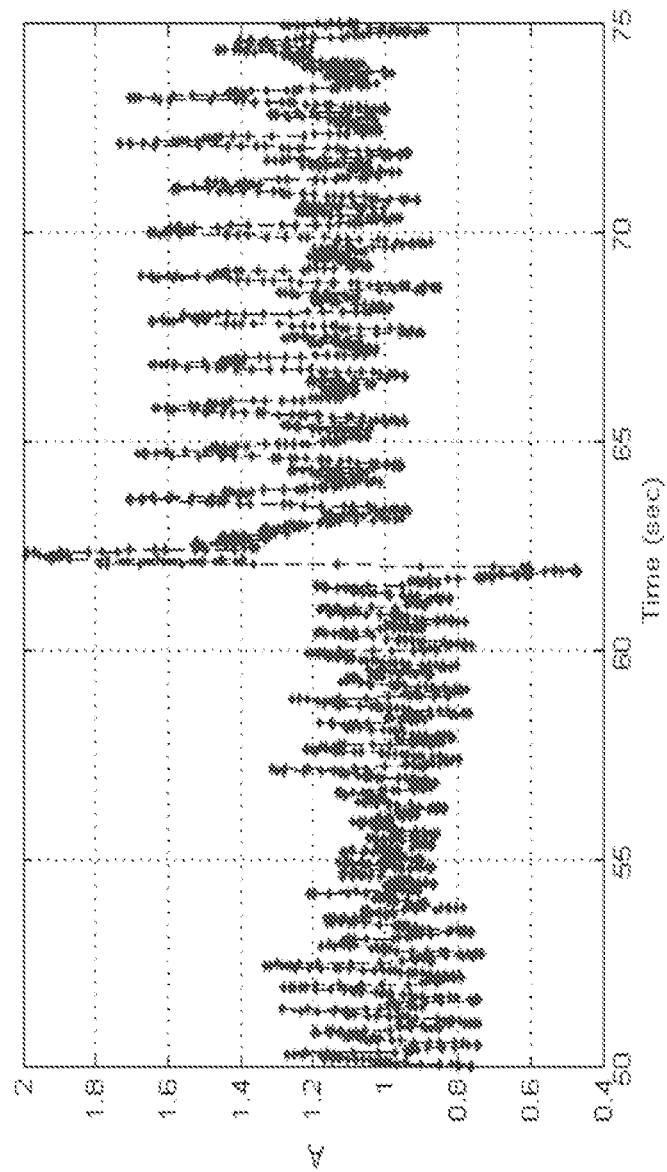
FIG. 2 illustrates the magnitude of the accelerometer output (acceleration magnitude A) in accordance with an embodiment of the present specification.

FIG. 2 shows the accelerometer magnitude A in standard or normal walking behavior when the device is in the user's hand. The periodicity and the rectangular shape of the signal may be the key elements to detect the type of the motion. The accelerometer magnitude A is analyzed in the time domain and frequency domain.

Time Domain Analysis

The accelerometer magnitude A is coupled to the Teager-Kaiser Kaiser Energy Operator 102 block. The Teager-Kaiser Energy Operator 102 is a non-linear filter, defined in continuous domain by:

$$\Psi(x(t)) = \dot{x}(t)^2 - x(t) \times \ddot{x}(t)$$

where $\dot{x}$ means the first derivative of x and $\ddot{x}$ means the second derivative. Also, in discrete form, it is defined as $$\Psi(x(n)) = x(n-1)^2 - x(n) \times x(n-2)$$

The Teager Energy Operator 102 is widely used in different applications, such as speech, image processing, and multi-path detection. In the present specification the Teager-Kaiser Energy Operator 102 may be used in the context of motion detection based inertial sensors.

Figure 3:
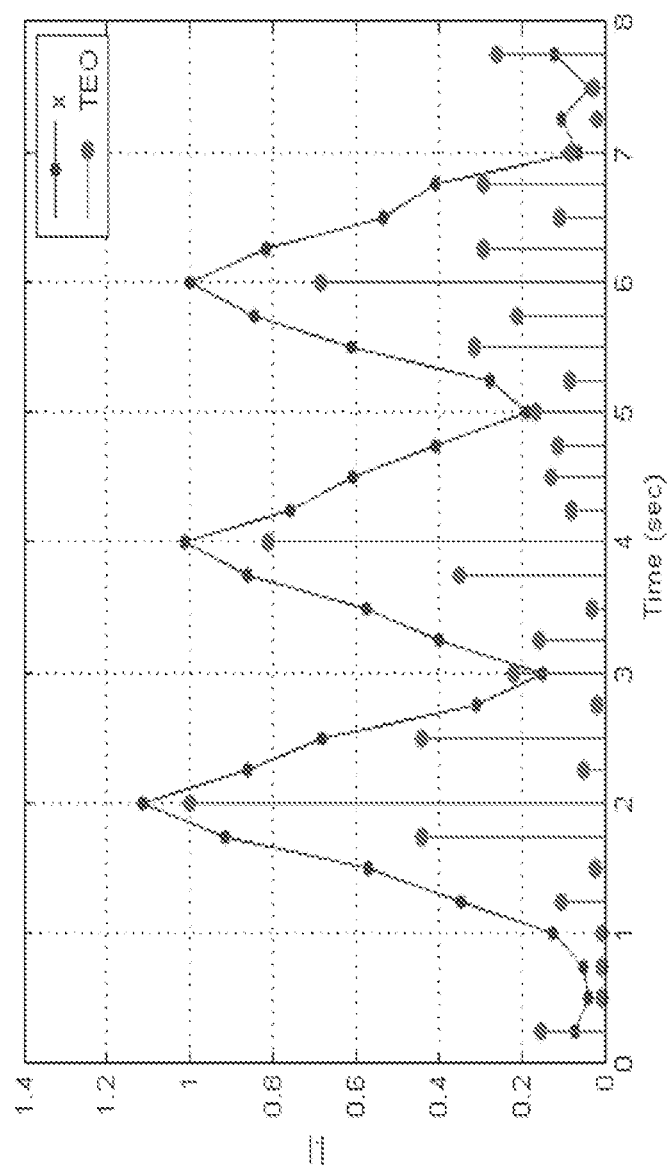
FIG. 3 illustrates a Teager-Kaiser Energy Operator (TEO) applied to rectangle shaped signal in accordance with an embodiment of the present specification.

The main performance of Teager-Kaiser Energy Operator 102 is the detection of peaks shaped with rectangular signal as illustrated in FIG. 3. This rectangular signal may have periodicity. Per FIG. 3, the small dots, labelled "x" denote the accelerometer magnitude A. Estimating the time of each peak is best achieved with TEO since the difference in levels between strongest peak and its neighbors is much higher than for the original signal x. As a result, setting the threshold would be much simpler and more robust to noise level. Estimating the time of each peak, may provide the fundamental period $T_0$ whenever it may exists in the incoming signal. This estimation may be made online and may be quasi-instantaneous (the filter has a latency of $2T_s$, where $T_s$ is the sampling period). Due to the instantaneous nature of the filter, the signal at the output of the accelerometer may be momentarily affected by noise and the peak separation may be disrupted. The output of Teager-Kaiser Energy Operator 102 is illustrated by the larger dots on FIG. 3. Per FIG. 1, the output of Teager-Kaiser Energy Operator 102 is coupled to first peak detection 103.

Frequency Domain Analysis

To overcome to the aforementioned disruptive behaviour, a simultaneous estimator in frequency domain is applied as shown in FIG. 1 to provide a second estimate of the same fundamental frequency $f_0$ ($f_0 = 1/T_0$). Frequency domain estimation is more robust to short term noise component, and the fundamental frequency may be detected.

This frequency domain estimation is implemented by buffer 106, where buffer 106 is size M, and fast Fourier transform, M-FFT 107. M is an integer and is meant to convey an M points buffer and the related M points fast Fourier transform. M may be a design choice. Per FIG. 1, the output of M-FFT 107 is coupled to second peak detection 108.

FIGS. 4A, 4B and 4C illustrate the frequency domain processing in accordance with an embodiment of the present specification. FIG. 4A illustrates the time domain output of the accelerometer over a window of three seconds. FIG. 4B illustrates the output of the fast Fourier transform of the time domain signal of FIG. 4A. FIG. 4C illustrates the output of the fast Fourier transform of the time domain signal of FIG. 4A after filtering out zero frequency components.

The fundamental frequency $f_0$ may be estimated at the second strongest peak.

The fundamental frequency $f_0$ is then used to decide on the movement style based on a look-up-table with pre-defined values. These values may be either constant (pre-programmed in advance), or they may be updated through training periods that the user may perform at any time.

Peak Detection—Look-Up Tables

As previously noted, per FIG. 1, the output of Teager-Kaiser Energy Operator 102 is coupled to first peak detection 103. The first peak detection 103 determines if there is a static status based on the incoming signal. A static status means that the number of peaks detected is minimal relative to sensing motion of the pedestrian. In this situation, the first peak detection 103 output a first output with a "No", resulting in "no motion" status and no further analysis results.

At the output of first peak detection 103, when a peak is detected (meaning that the signal is above certain threshold), the time of that peak is stored into memory ($t_{peak}^{(n)}$). When a second peak is detected then the signal frequency $f_0^{(1)}$ is computed as $f_0^{(1)} = 1/(t_{peak}^{(n)} - t_{peak}^{(n-1)})$.

When the number of peaks detected by first peak detection 103 is not minimal relative to sensing motion of the pedestrian. In this case, the first peak detection 103 generates a second output with a result indicating a positive peak status and the apparatus continues to analyze the motion of the pedestrian. The second output of first peak detection 103 is a "Yes", with a value of $f_0^{(1)}$ and occurs at time $t_{peak}^{(n)}$. The second output is coupled to memory 104. The output of memory 104 is $f_0^{(1)}$ and occurs at time $t_{peak}^{(n-1)}$. The second output of first peak detection 103 is coupled to a first input of look-up-table 110 and the output of memory 104 is coupled to the first input of look-up-table 110.

Per FIG. 1, the second output of second peak detection 108 is a "Yes", with a value of $f_0^{(2)}$ and occurs at time $t_{peak}^{(n)}$. Second peak detection 108 is responsible of detecting second peak (in reference to signal of FIG. 4C). If the peak is detected (meaning that the signal is above a certain threshold), the frequency at which the peak was found is denoted by $f_0^{(2)}$.

In contrast, when the number of peaks detected by the second peak detection 108 is not minimal relative to sensing motion of the pedestrian. In this case, the second peak detection 108 generates a second output indicating a positive peak status and the apparatus continues to analyze the motion of the pedestrian. Per FIG. 1, the second output of second peak detection 108 is a "Yes", with a value of $f_0^{(2)}$ and occurs at time $t_{peak}^{(n)}$. The second output of second peak detection 108 is coupled to a first input of look-up-table 110.

Look-up-table 110 generates outputs indicating periodic hand movements 111A, running 111B and walking 111C. Periodic hand movements 111A may include the movements of shaking, waving, gesturing, etc. Running 111B and walking 111C are step motions.

In summary, an apparatus for detecting pedestrian motion may include one or more processors that perform a time domain analysis and a frequency domain analysis, wherein the apparatus detects hand motion and step motion.

Figure 5:
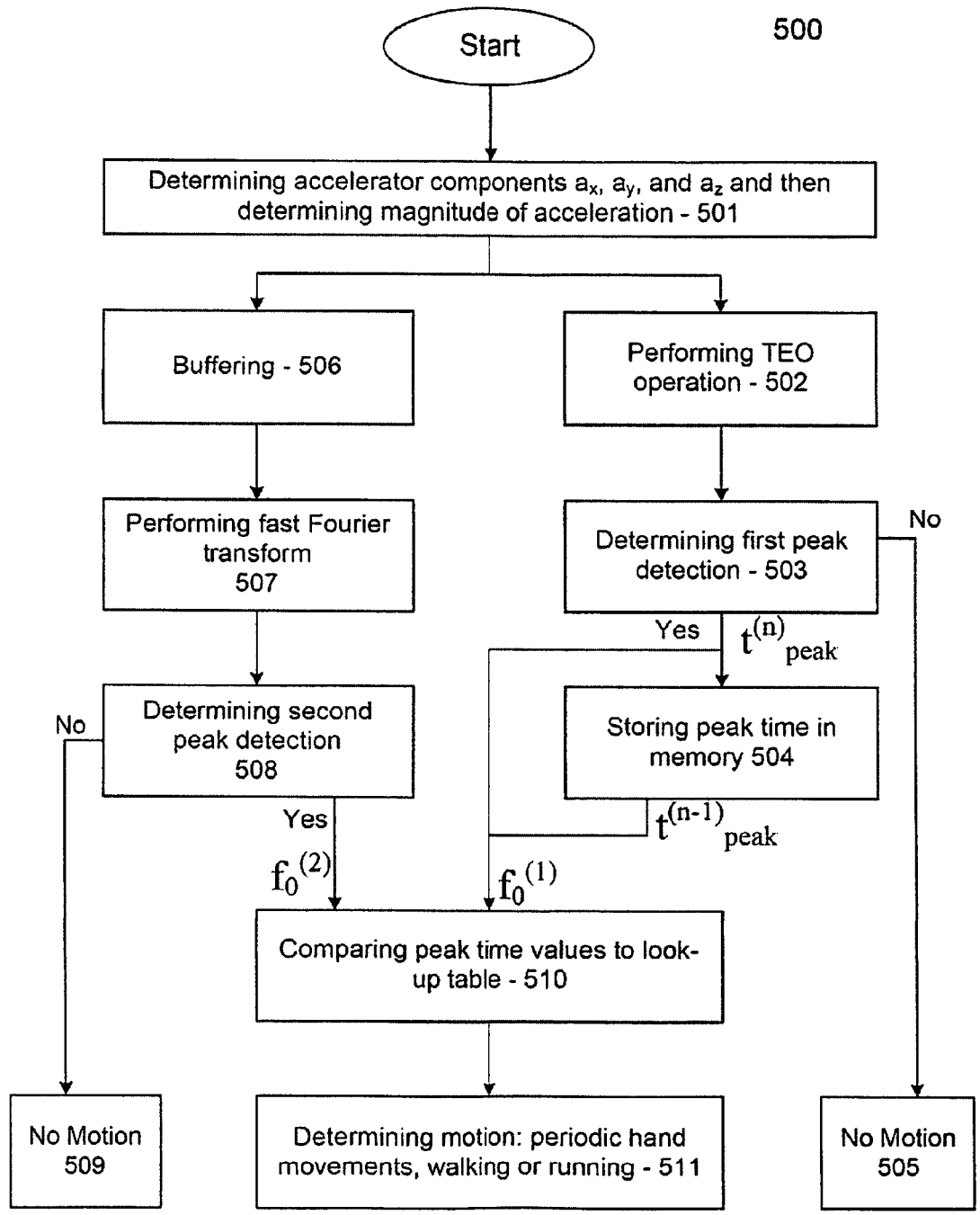
FIG. 5 illustrates a flow diagram of a method of determining pedestrian motion in accordance with an embodiment of the present specification.

The apparatus may further include an accelerometer 101A, wherein the output of the accelerometer 101A has components $a_x$, $a_y$, and $a_z$ and the magnitude of the output of the accelerometer is equal to square root of sum of $a_x^2 + a_y^2 + a_z^2$, wherein $a_x$, $a_y$, and $a_z$ comprise x, y, and z components of the accelerometer 101A. The apparatus may further include:

a Teager-Kaiser Energy Operator 102, wherein the magnitude of the output of the accelerometer A is coupled to input of the Teager-Kaiser Energy Operator 102;

a first peak detection 103, wherein the output of the Teager-Kaiser Energy Operator 102 is coupled to input of the first peak detection 103, and wherein if static operation is detected, a first output is provided by the first peak detection 103 indicating no motion state 105, and wherein if there is positive peak status, a second output is provided by the first peak detection 103;

a memory 104, wherein the second output of the first peak detection 103 is coupled to an input of the memory 104, and the second output of the first peak detection 103 is coupled to a first input of a look-up table 110, and the output of the memory 104 is coupled to the first input of the look-up-table 110, wherein the second output of the first peak detection 103 represents a first peak detection 103 output at time t, and the output of the memory represents the first peak detection output at time t−1;

The apparatus may further include:

a buffer 106, wherein the magnitude of the output of the accelerometer A is coupled to the input of the buffer 106, wherein the buffer 106 has a size M;

a fast Fourier transform, M-FFT 107, supporting a size M, wherein the output of the buffer 106 is coupled to the input of the fast Fourier transform; and a second peak detection 108, wherein the output of the fast Fourier transform is coupled to the input of the second peak detection 108, and wherein if static status is detected, a first output is provided by the second peak detection 108 indicating no motion state 109, and wherein if there is positive peak status, a second output of the second peak detection 108 is provided, and wherein the second output of the second peak detection 108 is coupled to a second input of the look-up-table 110; and the look-up-table 110, an output of the look-up table 110 indicates if the pedestrian motion comprises hand motion and/or step motion. The apparatus may be a hand-held device. FIG. 5 illustrates a flow diagram 500 of a method of determining pedestrian motion in accordance with an embodiment of the present specification. The method may include performing a time domain analysis; performing a frequency domain analysis; and utilizing one or more processors to perform the time domain analysis and the frequency domain analysis, wherein pedestrian motion includes hand motion and pedestrian step motion. The method may include the step of determining status of a first peak detection 103 and a second peak detection 108 and comparing the results against predefined values in a look-up table 110.

The aforementioned method may include the following detailed steps:

Step 501—Determining accelerometer output components $a_x$, $a_y$, and $a_z$ and subsequently determining magnitude of acceleration A, wherein magnitude of output of accelerometer A is equal to square root of sum of $a_x^2 + a_y^2 + a_z^2$, wherein $a_x$, $a_y$, and $a_z$ comprise x, y, and z components of the accelerometer 101A;

Step 502—Performing the time domain analysis based on the magnitude of the acceleration A, wherein the time domain analysis is based on a Teager-Kaiser Energy Operator 102 (TEO);

Step 503—Determining a first peak detection 103 based on output of the Teager-Kaiser Energy Operator 102. If static status is detected, a first output (No) is provided by the first peak detection 103. If there is a positive peak status, a second output (Yes) is provided by the first peak detection 103.

Step 504—Storing peak time in memory.

Step 505—Indicating a no motion state 105, based on the step 503.

Step 506—Buffering the magnitude of acceleration A in a buffer 106 of size M.

Step 507—Performing the frequency domain analysis based on buffered magnitude of acceleration, wherein the frequency domain analysis is based on a fast Fourier transform, supporting size M.

Step 508—Determining a second peak detection 108 based on the output of the fast Fourier transform, wherein if static status is detected, a first output (No) is provided by the second peak detection 108 indicating a no motion state 109, and wherein if there is a positive peak status, a second output (Yes) is provided by the second peak detection.

Step 509—Indicating a no motion state 109, based on the step 508.

Step 510—

(1) Coupling the second output of the first peak detection 103 to the output of the memory 104 to generate the frequency value $f_0^{(1)}$. Wherein the second output of the first peak detection 103 represents a first peak detection 103 output at time t, and the output of the memory 104 represents the first peak detection 103 output at time t−1. The value $f_0^{(1)}$ is then coupled to the first input to a look-up table 110.

(2) Coupling the second output of the second peak detection 108 in a second input to the look-up-table 110;

(3) Comparing the inputs $f_0^{(1)}$ and $f_0^{(2)}$ to the pre-determined values of the look-up-table 110.

Step 511—Determining hand and/or step motion from the look-up-table 110.

While various embodiments of the Specification have been described, it will be apparent to those of ordinary skill in the art that many more embodiments and implementations are possible that are within the scope of this Specification. For example, any combination of any of the apparatus or methods described in this disclosure is possible.

What is claimed is:

1. A computer-implemented method of detecting motion of a pedestrian, the method performed by one or more processors and comprising the steps of:

determining a magnitude of acceleration;

performing a time domain analysis on the acceleration magnitude to generate a time-based representation of the acceleration;

performing a frequency domain analysis on the acceleration magnitude to generate a frequency-based representation of the acceleration; and determining whether the pedestrian is in motion in response to the time-based representation and the frequency-based representation, wherein determining whether the pedestrian is in motion comprises:

determining whether a number of first peaks of the time-based representation exceed a first threshold;

determining whether a number of second peaks of the frequency-based representation exceed a second threshold; and comparing the first peaks and one of the second peaks with predetermined values.

2. The method of claim 1, wherein the time domain analysis is performed using a Teager-Kaiser Energy Operator.

3. The method of claim 1, wherein the frequency domain analysis is performed using a fast Fourier transform.

4. The method of claim 3, wherein the acceleration magnitude is a rectangular shape with a periodicity.

5. A computer-implemented method of detecting motion of a pedestrian, the method performed by one or more processors and comprising the steps of:

determining a magnitude of acceleration;
performing a time domain analysis on the acceleration magnitude to generate a time-based representation of the acceleration;
performing a frequency domain analysis on the acceleration magnitude to generate a frequency-based representation of the acceleration; and
determining whether the pedestrian is in motion in response to the time-based representation and the frequency-based representation, wherein determining whether the pedestrian is in motion further comprises the steps of:
  detecting a number of first peaks in the time-based representation;
  detecting a number of second peaks in the frequency-based representation; and
  determining whether the number of first peaks or second peaks indicates motion of the pedestrian, wherein determining whether the number of first peaks or second peaks indicates motion of the pedestrian comprises:
    determining a first time value associated with one of the first peaks;
    computing a first frequency value from the first time value;
    determining a second frequency value associated with one of the second peaks; and
    comparing the first and second frequency values with a predetermined frequency value stored in a look-up table.

6. The method of claim 1, wherein the pedestrian motion comprises a hand motion and a step motion.

7. The method of claim 6, wherein the step motion comprises running and walking.

8. The method of claim 6, wherein the hand motion comprises shaking, waving, and gesturing.

9. A computer-implemented method of detecting motion of a pedestrian, the method performed by one or more processors and comprising the steps of:
  determining a magnitude of acceleration;
  performing a time domain analysis on the acceleration magnitude to generate a time-based representation of the acceleration;
  performing a frequency domain analysis on the acceleration magnitude to generate a frequency-based representation of the acceleration; and
  determining whether the pedestrian is in motion in response to the time-based representation and the frequency-based representation, wherein determining whether the pedestrian is in motion further comprises the steps of:
  determining whether a number of first peaks of the time-based representation exceed a first threshold;
  if the first peaks do not exceed the first threshold, indicating no pedestrian motion;
  if the first peaks exceed the first threshold, computing a first frequency value from a pair of first peak detection values;
  determining whether a number of second peaks of the frequency-based representation exceed a second threshold;
  if the second peaks do not exceed the second threshold, indicating no pedestrian motion;
  if the second peaks exceed the second threshold, generating a second peak detection value;
  comparing the first frequency value and the second peak detection value with predetermined frequency values stored in a look-up table; and
  selectively indicating pedestrian motion in response to the comparing.

10. An apparatus for detecting motion of a pedestrian, the pedestrian motion including hand motion and step motion, the apparatus comprising:
  an accelerometer having an output to generate a magnitude of acceleration;
  an energy operator, coupled to the accelerometer, to generate a time-based representation of the acceleration;
  an estimator, coupled to the accelerometer, to generate a frequency-based representation of the acceleration;
  a first peak detection circuit, coupled to the energy operator, to determine whether a number of first peaks of the time-based representation exceed a first threshold;
  a second peak detection circuit, coupled to the estimator, to determine whether a number of second peaks of the frequency-based representation exceed a second threshold; and
  a look-up table, coupled to the first and second peak detection circuits, to compare the first peaks and one of the second peaks with predetermined values stored in the look-up table.

11. The apparatus of claim 10, wherein the look-up table is to generate an output signal indicating the pedestrian motion.

12. The apparatus of claim 10, wherein the energy operator comprises a Teager-Kaiser Energy Operator.

13. The apparatus of claim 10, wherein the estimator comprises a buffer and fast Fourier transform.

14. The apparatus of claim 10, wherein the first peak detection circuit is to indicate no pedestrian motion if the first peaks do not exceed the first threshold.

15. The apparatus of claim 10, wherein the second peak detection circuit is to indicate no pedestrian motion if the second peaks do not exceed the second threshold.

16. The apparatus of claim 10, wherein the magnitude of acceleration comprises a square root of the sum of $a_x^2 + a_y^2 + a_z^2$, wherein $a_x$, $a_y$, and $a_z$ comprise x, y, and z components of the accelerometer.

17. The apparatus of claim 10, wherein the step motion comprises running and walking.

18. The apparatus of claim 10, wherein the hand motion comprises shaking, waving, and gesturing.

19. The apparatus of claim 10, wherein the apparatus is a hand-held device.

* * * * *